US012742311B2

(12) United States Patent
Mesones Aurich et al.

(10) Patent No.: US 12,742,311 B2
(45) Date of Patent: Sep. 22, 2026

(54) INTELLIGENT MONITORING SYSTEM FOR MINERAL LOADING PROCESS

(71) Applicants: JEBI S.A.C., Lima (PE); Mauricio Mesones Aurich, Beverly Hills, CA (US)

(72) Inventors: Mauricio Mesones Aurich, Los Angeles, CA (US); Christian Portugal Zambrano, Sabandia (PE); Eder Joel Vivanco Olivera, Cercado de Lima (PE); Yherico Alberto Carpio Reynoso, Arequipa (PE); Marlon Arnaldo Valerio Ogosi, Lima (PE)

(73) Assignee: JEBI S.A.C., Lima (PE)

( * ) Notice: Subject to any disclaimer, the term of this patent is extended or adjusted under 35 U.S.C. 154(b) by 0 days.

(21) Appl. No.: 18/690,982

(22) PCT Filed: Sep. 12, 2022

(86) PCT No.: PCT/IB2022/058595

§ 371 (c)(1), (2) Date: Mar. 11, 2024

(87) PCT Pub. No.: WO2023/037344

PCT Pub. Date: Mar. 16, 2023

(65) Prior Publication Data

US 2024/0263427 A1 Aug. 8, 2024

(30) Foreign Application Priority Data

Sep. 10, 2021 (PE) ........................ 001494-2021/DIN

(51) Int. Cl.

*G06F 7/70* (2006.01)
*E02F 9/26* (2006.01)
*G06T 7/00* (2017.01)

(52) U.S. Cl.

CPC .............. *E02F 9/264* (2013.01); *E02F 9/267* (2013.01); *G06T 7/0004* (2013.01);

(Continued)

(58) Field of Classification Search

CPC ........ E02F 9/264; E02F 9/267; G06T 7/0004; G06T 2207/10012; G06T 2207/10024;

(Continued)

(56) References Cited

U.S. PATENT DOCUMENTS 6,990,390 B2 1/2006 Groth et al.
8,411,930 B2 4/2013 Ridley et al.

(Continued)

FOREIGN PATENT DOCUMENTS

CN 113361540 9/2021
CN 113361540 A 9/2021

(Continued)

OTHER PUBLICATIONS

National Institute of Industrial Property (Chile), Patents—Opposition—Online Filing, Sep. 10, 2024.

(Continued)

*Primary Examiner* — Adam M Alharbi
(74) *Attorney, Agent, or Firm* — Benjamin P. Kuo; Esther Kim

(57) ABSTRACT

The “GET smart” system uses AI modeling and neural network technology to efficiently identify wear part loss events and provide other useful metrics during excavator operation to improve efficiency and reduce downtime. The system monitors the integrity of ground engaging tools (GETs) by way of multidimensional sensors, determining regions of interest, and creating and processing enriched tensors via embedded systems with a combination of CPUs and TPUs.

5 Claims, 22 Drawing Sheets

(52) U.S. Cl.
CPC ............... *G06T 2207/10012* (2013.01); *G06T 2207/10024* (2013.01); *G06T 2207/10028* (2013.01); *G06T 2207/20084* (2013.01); *G06T 2207/30164* (2013.01)

(58) Field of Classification Search
CPC . G06T 2207/10028; G06T 2207/20084; G06T 2207/3016
See application file for complete search history.

(56) References Cited

U.S. PATENT DOCUMENTS

| | | | |
|---|---|---|---|
| 9,418,309 | B2 | 8/2016 | Tafazoli Bilandi et al. |
| 9,483,820 | B2 | 11/2016 | Lim et al. |
| 9,613,413 | B2 | 4/2017 | Hasselbusch et al. |
| 9,670,649 | B2 | 6/2017 | Bewley et al. |
| 9,714,923 | B2 | 7/2017 | Behmlander et al. |
| 9,886,754 | B2 | 2/2018 | Lim et al. |
| 10,011,975 | B2 | 7/2018 | Carpenter et al. |
| 10,013,767 | B2 | 7/2018 | Chiang et al. |
| 10,024,033 | B2 | 7/2018 | Bewley et al. |
| 10,249,060 | B2 | 4/2019 | Wagner et al. |
| 10,339,667 | B2 | 7/2019 | Tafazoli Bilandi et al. |
| 10,429,272 | B2 | 10/2019 | Lu et al. |
| 10,504,072 | B2 | 12/2019 | Restum et al. |
| 10,612,213 | B2 | 4/2020 | Carpenter et al. |
| 10,633,831 | B2 | 4/2020 | Carpenter et al. |
| 10,633,832 | B2 | 4/2020 | Carpenter et al. |
| 10,669,698 | B2 | 6/2020 | Carpenter et al. |
| 10,683,642 | B2 | 6/2020 | Bewley et al. |
| 10,689,832 | B2 | 6/2020 | Bewley et al. |
| 10,689,833 | B2 | 6/2020 | Bewley et al. |
| 10,697,154 | B2 | 6/2020 | Bewley et al. |
| 10,760,247 | B2 | 9/2020 | Carpenter et al. |
| 10,787,792 | B2 | 9/2020 | Carpenter et al. |
| 10,929,820 | B2 | 2/2021 | Restum et al. |
| 11,001,992 | B2 | 5/2021 | Morimoto |
| 11,268,881 | B2 | 3/2022 | Finn et al. |
| 11,280,067 | B2 | 3/2022 | Darlington et al. |
| 11,447,931 | B2 | 9/2022 | Plouzek et al. |
| 12,086,925 | B2 * | 9/2024 | Lombardi ............... G06T 7/593 |
| 2012/0250979 | A1 * | 10/2012 | Yokoyama ................ G06T 5/94 382/154 |
| 2015/0085123 | A1 | 3/2015 | Tafazoli Bilandi et al. |
| 2016/0237640 | A1 | 8/2016 | Carpenter et al. |
| 2016/0376771 | A1 | 12/2016 | Behmlander et al. |
| 2017/0091924 | A1 | 3/2017 | Hasselbusch et al. |
| 2017/0103506 | A1 | 4/2017 | Dandibhotla et al. |
| 2017/0352199 | A1 | 12/2017 | Finley et al. |
| 2018/0089823 | A1 | 3/2018 | Carpenter et al. |
| 2018/0100291 | A1 | 4/2018 | Bewley et al. |
| 2020/0063402 | A1 | 2/2020 | Leslie et al. |
| 2020/0132882 | A1 | 4/2020 | Runkana et al. |
| 2020/0244963 | A1 | 7/2020 | Patwary et al. |
| 2020/0363203 | A1 | 11/2020 | Plouzek et al. |
| 2020/0370280 | A1 | 11/2020 | Carpenter et al. |
| 2020/0393303 | A1 | 12/2020 | Betournay et al. |
| 2021/0262204 | A1 * | 8/2021 | Tafazoli Bilandi .... G06N 3/082 |
| 2022/0101047 | A1 * | 3/2022 | Puri .......................... G06T 5/30 |
| 2022/0136217 | A1 | 5/2022 | Petrany et al. |
| 2022/0136218 | A1 | 5/2022 | Ram et al. |
| 2022/0188774 | A1 | 6/2022 | Reaume et al. |
| 2022/0205224 | A1 | 6/2022 | Koga |
| 2022/0282451 | A1 * | 9/2022 | Ready-Campbell ... G05D 1/024 |
| 2022/0307234 | A1 | 9/2022 | Hillier et al. |
| 2023/0270376 | A1 * | 8/2023 | Varadarajan ......... A61B 5/7264 600/408 |

FOREIGN PATENT DOCUMENTS

| | | | |
|---|---|---|---|
| EP | 4384668 | A1 | 6/2024 |
| WO | 2019227194 | | 12/2019 |
| WO | 2020237324 | A1 | 12/2020 |
| WO | 2021041988 | | 3/2021 |
| WO | 2022018513 | | 1/2022 |
| WO | 2022020635 | | 2/2022 |
| WO | 2022087661 | | 5/2022 |
| WO | 2022247103 | | 12/2022 |

OTHER PUBLICATIONS

ISA/KR, International Search Report for PCT/IB2022/058595, Feb. 22, 2023.

IPEA/KR, International Preliminary Report on Patentability for PCT/IB2022/058595, Feb. 5, 2024.

European Patent Office, European Search Report for PCT/IB2022058595, Aug. 12, 2025.

Ji Shengfei et al: "Bucket Teeth Detection Based on Faster Region Convolutional Neural Network", IEEE Access, vol. 9, Jan. 25, 2021 (Jan. 25, 2021), pp. 17649-17661, IEEE, USA.

Ramezani Mahdi et al: "Using Artificial Intelligence in Mining Excavators: Automating Routine Operational Decisions", IEEE Industrial Electronics Magazine, vol. 15, No. 1, Dec. 14, 2020 (Dec. 14, 2020), pp. 6-11, IEEE, USA.

* cited by examiner

INTELLIGENT MONITORING SYSTEM FOR MINERAL LOADING PROCESS

CROSS-REFERENCE TO RELATED APPLICATIONS

This application claims benefit of priority to prior-filed Peru Application 001494-2021/DIN filed Sep. 10, 2021 of which the entire contents thereof are hereby incorporated by reference into the present disclosure.

BACKGROUND OF THE INVENTION

The invention mainly relates to systems and methods for monitoring mineral loading in mining excavation equipment.

Heavy equipment, such as excavators, are routinely employed in mineral and earth mining. Such machines are equipped with a shovel or bucket and quickly move loose ore into waiting vehicles for downstream processing. The operating implement that engages the loose rock are equipped with one or more ground engaging tools (GET) that is designed to be sacrificed at certain stages of wear. Because these parts have high hardness, loss of the part may damage downstream equipment such as crushers and conveyor belts. Such events, while rare, can result in significant downtime and safety hazards. It is therefore important for mining operations to detect the loss of a wear part as close to the loss event as possible.

Various techniques to detect GET loss events have been contemplated in the prior art. For example, techniques such as capturing successive images of the operating implement and measuring the intensity value of the pixels to determine whether a subset of pixels correspond to the wear part. Other techniques embed RFID modules within the GET to establish its position.

However, since actual GET loss events only happen on average once per excavator per year, many of these systems suffer from an unacceptable level of false alerts, resulting in unnecessary work stoppage or operator fatigue and disregard of alarms (the "cry-wolf syndrome"), or require specialized GETs (such as in RFID implementations) that are very expensive.

It is also impractical to employ humans for frequent inspections because the size of the excavators are massive and present a danger to personnel nearby. They must also work day or night, in very hot or very cold conditions, or in inclement weather.

BRIEF SUMMARY OF THE INVENTION

The present invention, named the "GET smart" system, uses AI modeling and neural network technology to efficiently identify wear part loss events and provide other useful metrics during excavator operation to improve efficiency and reduce downtime.

In one embodiment, the invention monitors the integrity of ground engaging tools (GETs), which have the potential to cause catastrophic damage within the mining operations downstream from earth moving steps.

The invention uses a variety of multidimensional sensors to gather information pertaining to the excavator, its components, and its surroundings. All information is then structured into a unique data structure called the enriched tensor and processed in real-time using an embedded system comprising CPUs and tensor processing units (TPUs). The data is processed via statistical and artificial intelligence (AI) techniques, involving neural networks and visual transformers.

The invention uses several parallel and independent processing techniques to produce discrete results, which are evaluated individually by a custom algorithm to accurately detect missing GETs within acceptable false positive rates. Upon identification of a "true positive" event, the invention notifies the operator via an in-cab monitor, and also to remote users via cloud and mobile applications.

Other metrics relevant to the earth-moving process are computed by the invention. These include detecting the wear level of a GET, the volume of minerals per shovel bucket, and the average particle size.

BRIEF DESCRIPTION OF THE TABLES AND DRAWINGS

Table 1 is a summary chart of a training dataset.

Figure 3A:
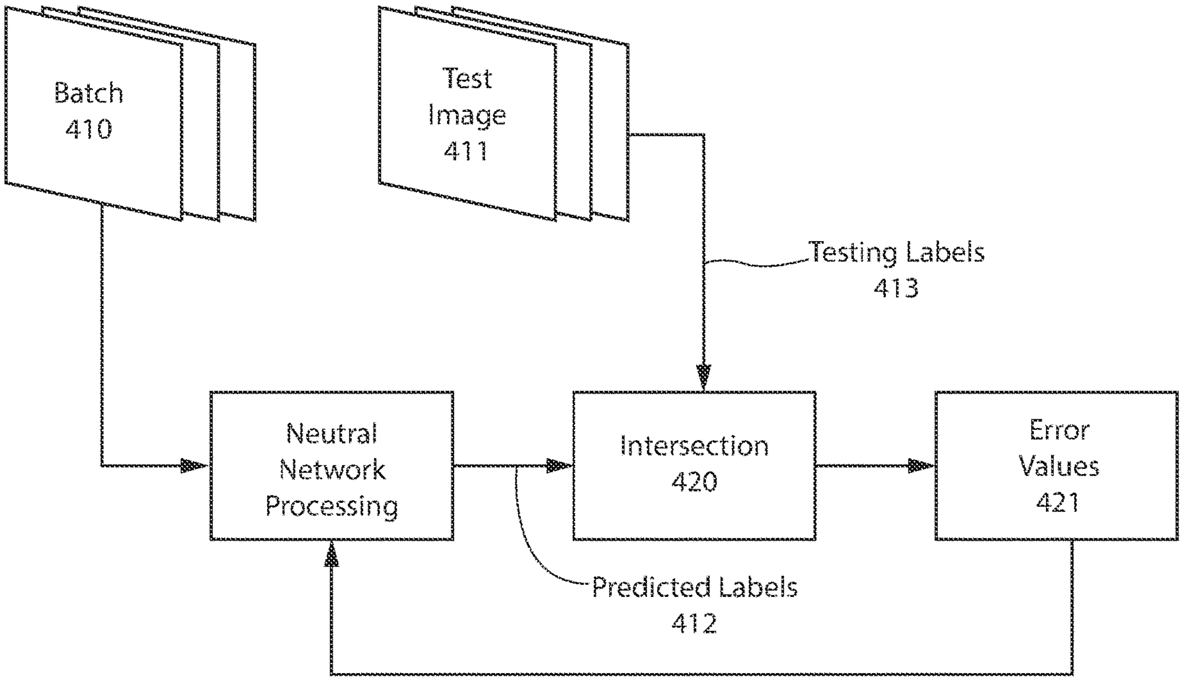

FIG. 3A illustrates a training process.

Figure 4A:
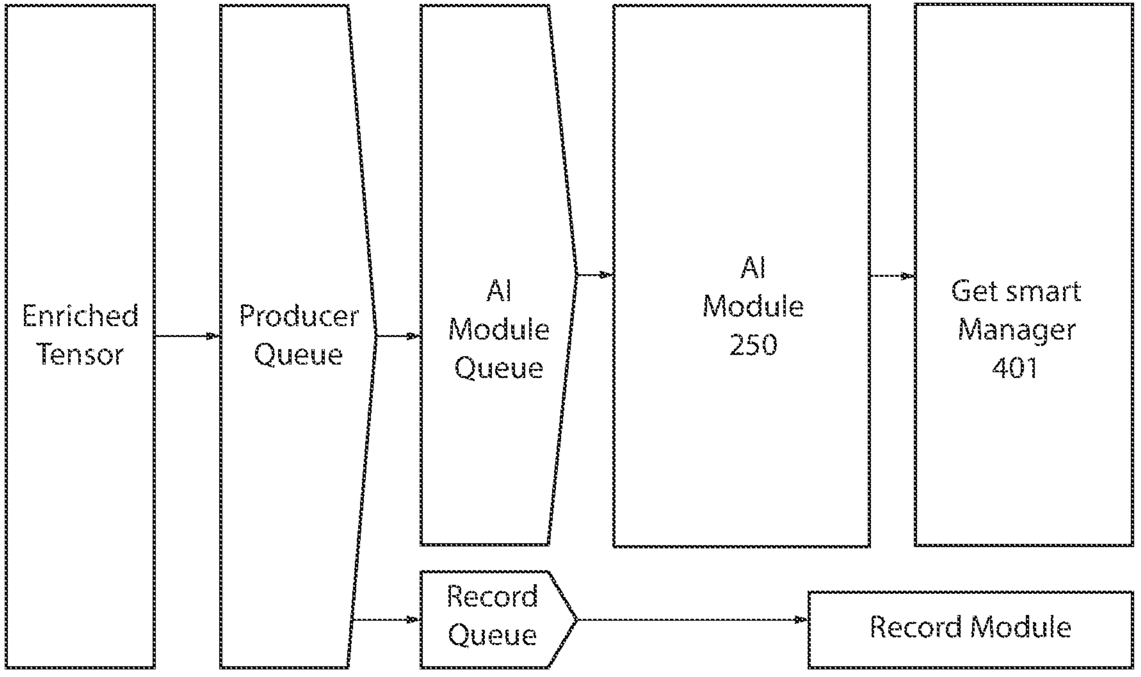

FIG. 4A is a flow diagram illustrating dataflow from the enriched tensor.

Figure 4B:
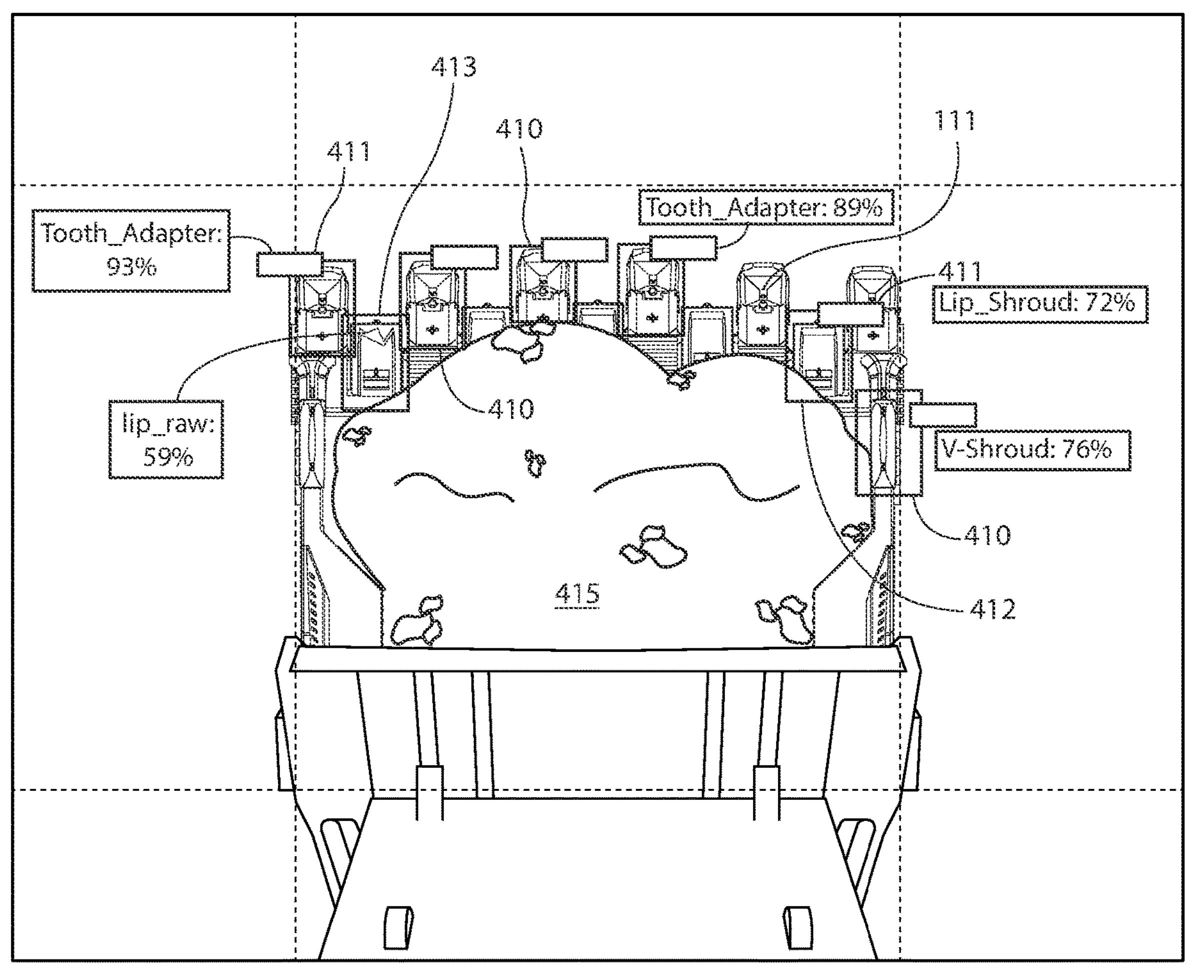

FIG. 4B illustrates labels and confidence values.

Figure 4C:
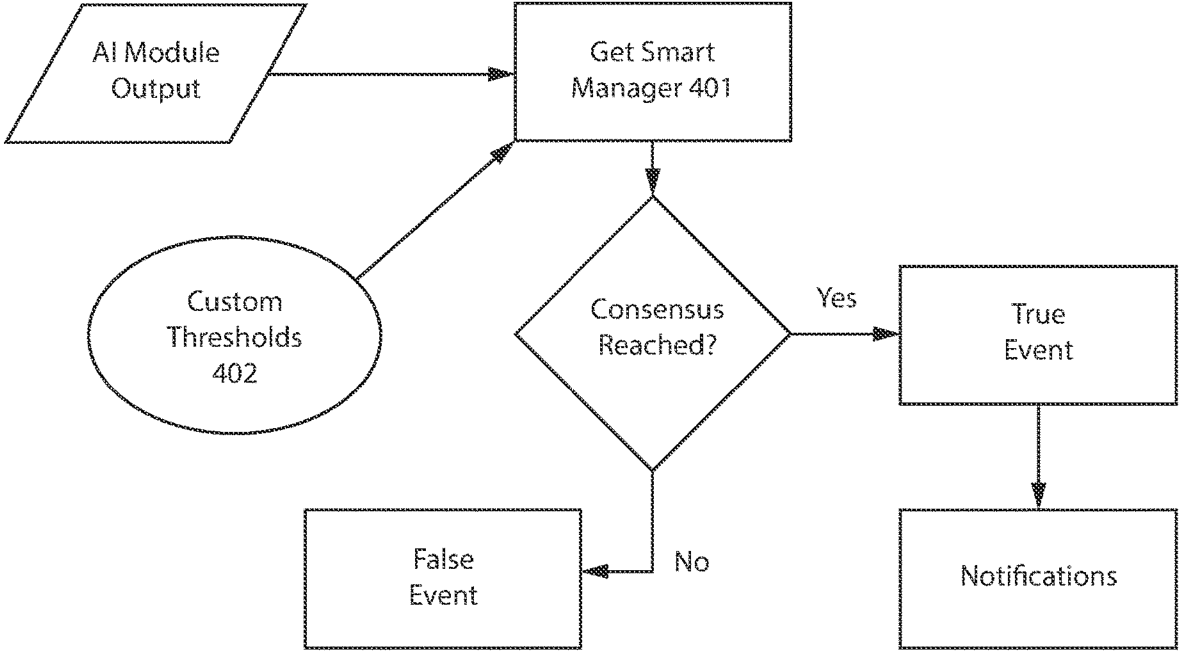

FIG. 4C is a flow diagram illustrating the GET smart manager.

Figure 4D:
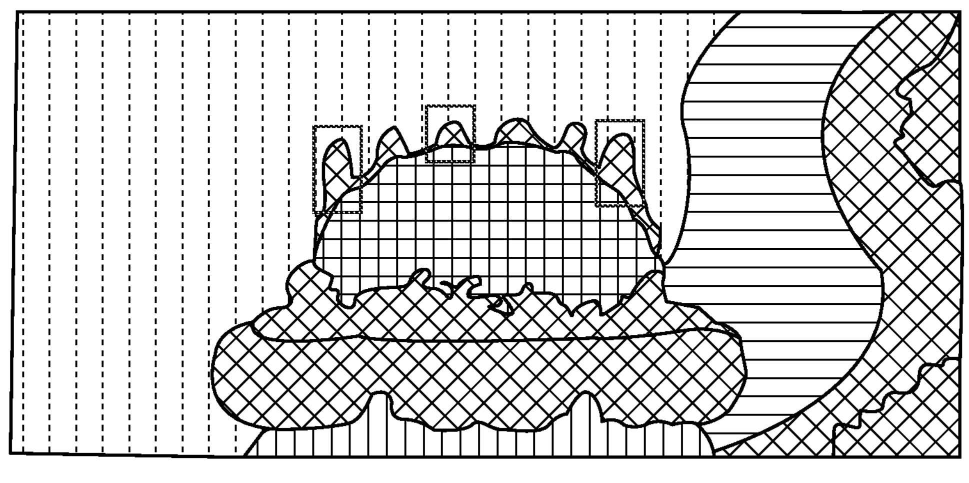
Figure 4D:
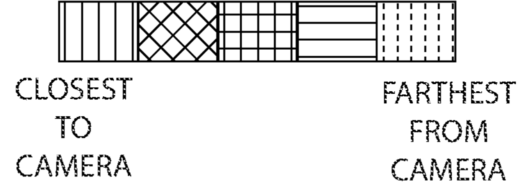

FIG. 4D illustrates a depth map relating to regions of interest.

Figure 4E:
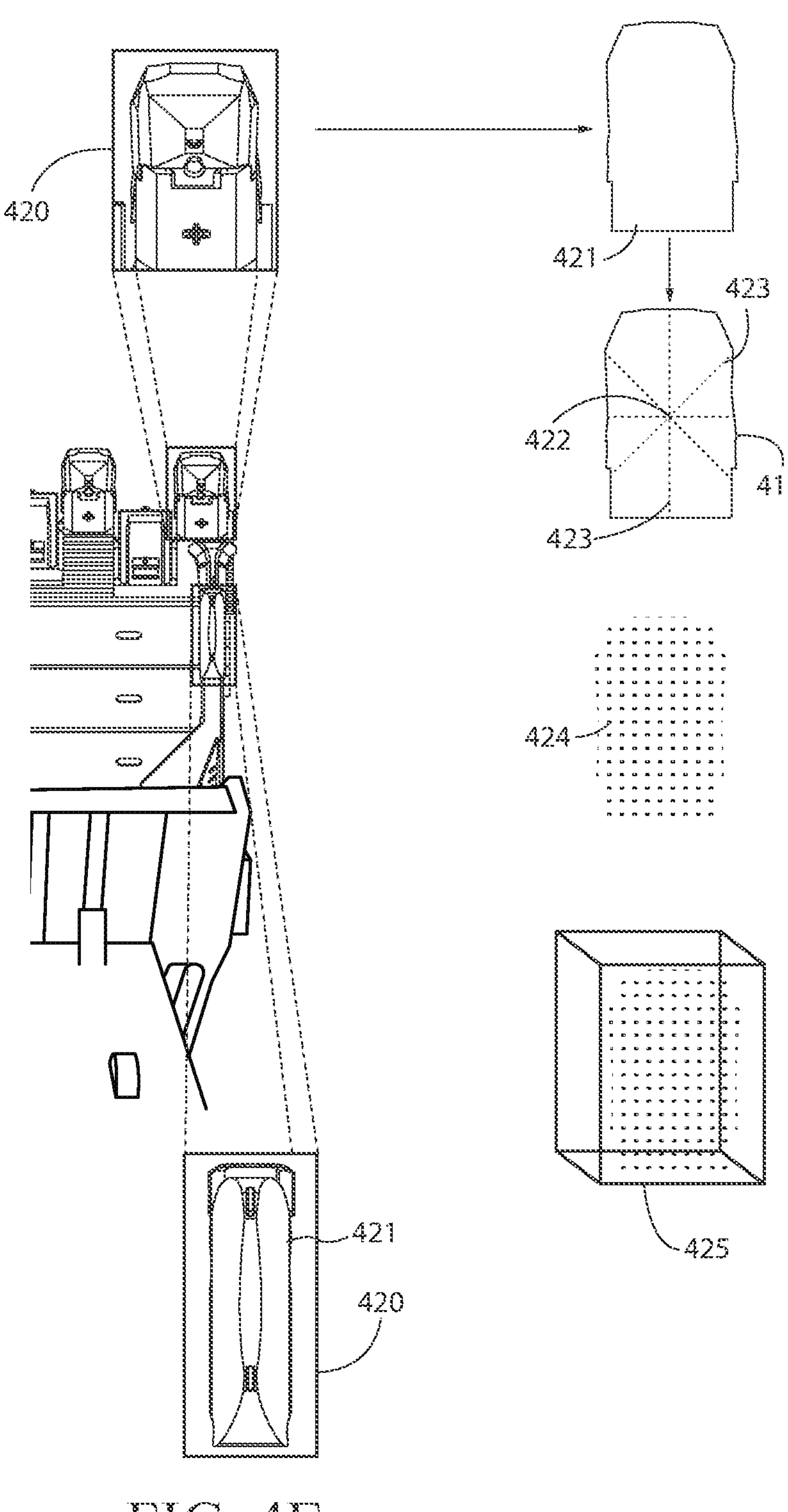

FIG. 4E illustrates the functioning of the wear detection app.

Figure 5A:
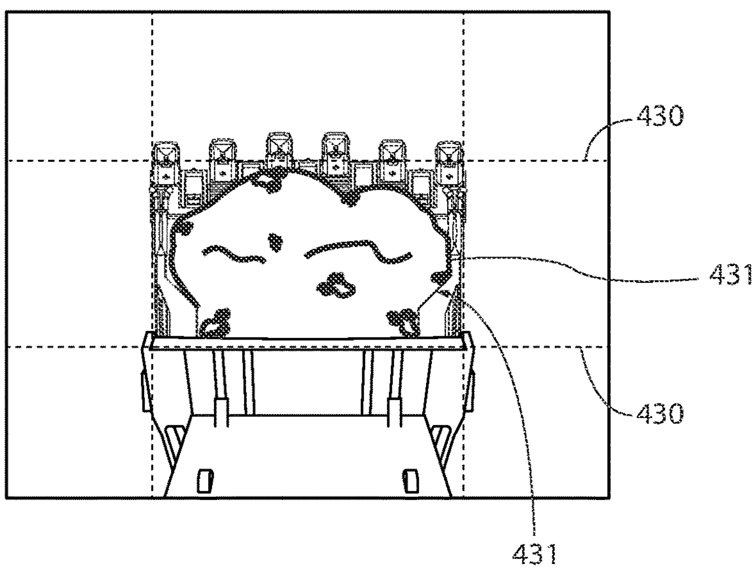

FIG. 5A illustrates the objection recognition of the volumetric analysis app.

Figure 5B:
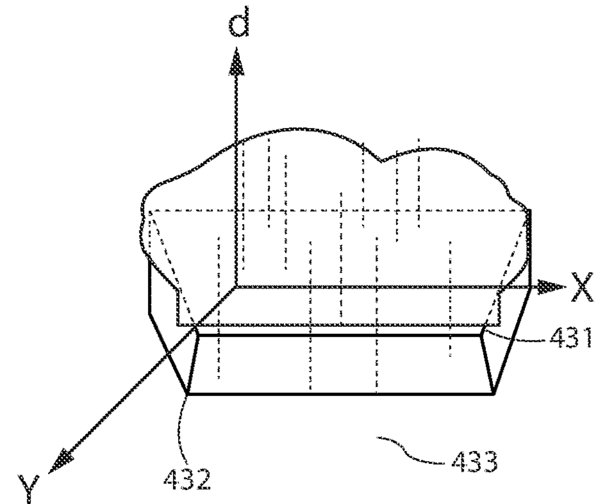

FIG. 5B illustrates the calculations performed by the volumetric analysis app.

Figure 5C:
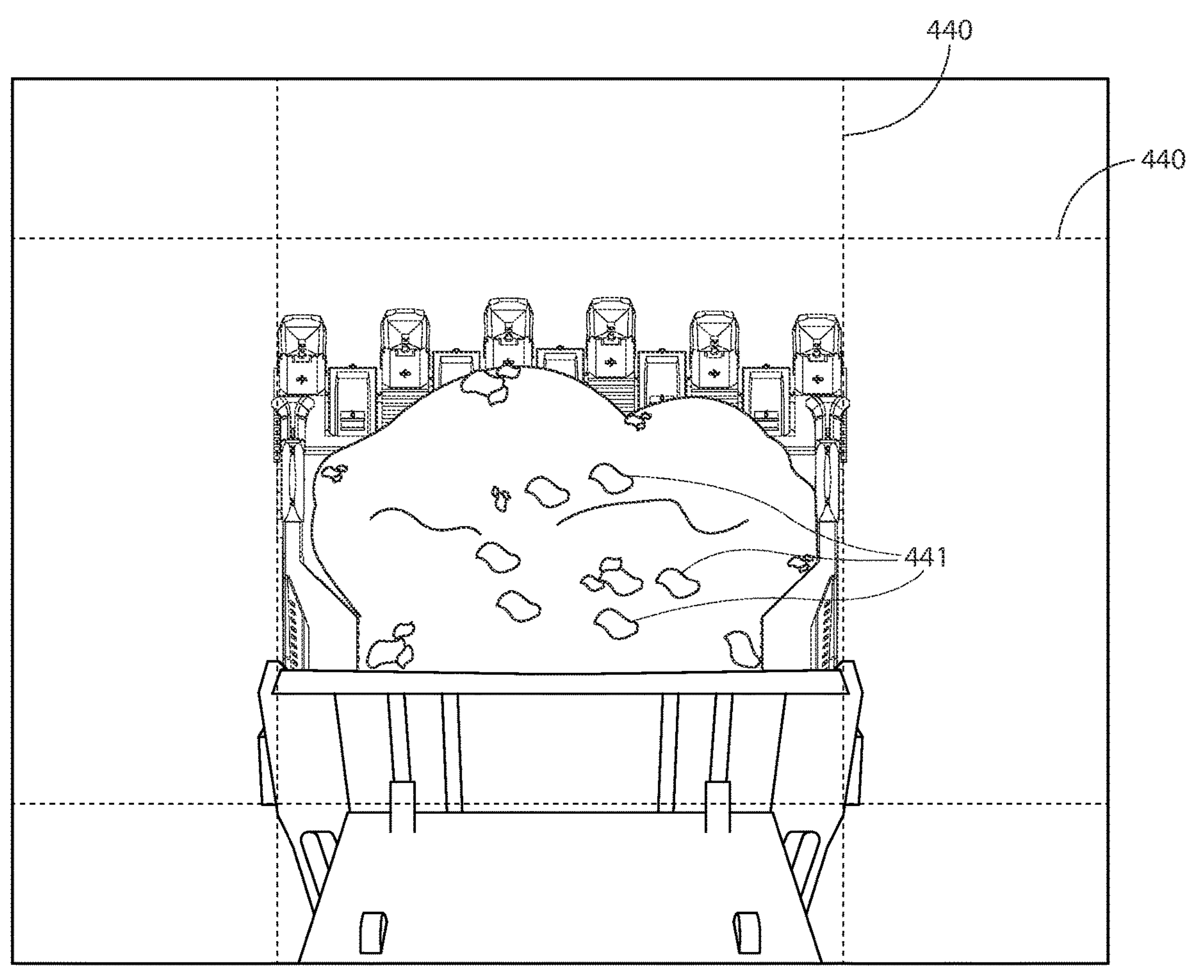

FIG. 5C illustrates the object recognition of the particle size analysis app.

Figure 5D:
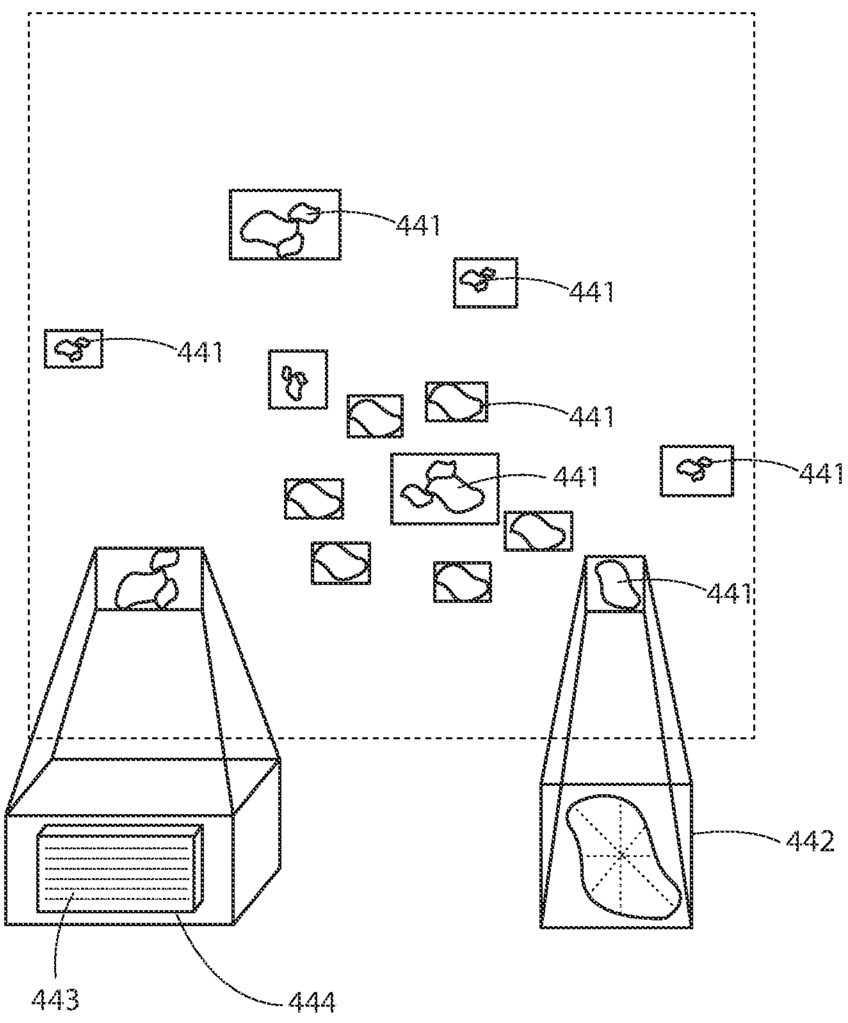

FIG. 5D illustrates the calculations performed by the particle size analysis app.

DETAILED DESCRIPTION

Implementation Environment, Hardware, and User Interface

Figure 1A:
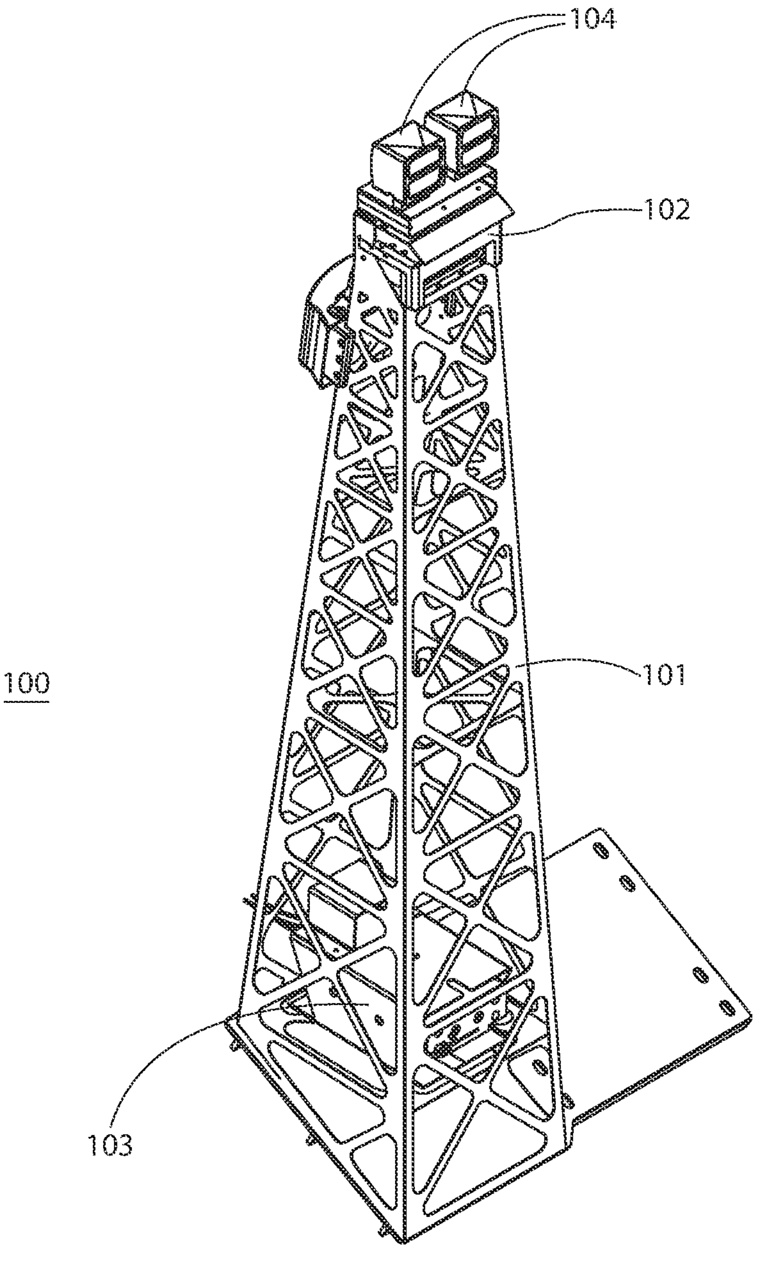
FIG. 1A illustrates the hardware assembly.

FIG. 1A is an exemplary embodiment of the hardware assembly required for the functioning of the system. Tower assembly 100 comprises of a mast 101, a data collection unit 102, and a processing enclosure 103. The data collection unit comprises sensory equipment used to collect visual, depth, and inertial data, as well as equipment used to illuminate the work area and to maintain the sensors in good working order. The mast comprises a base for installation in a high vibration and harsh environment; it contains slots to engage the various hardware components and protected locations to run electrical cables. A pair of headlamps 104 provide illumination required for visual detection and to aid the operator.

Processing enclosure 103 comprises essentially a computer to which the software portion of the invention is run, and a power management unit.

Figure 1B:
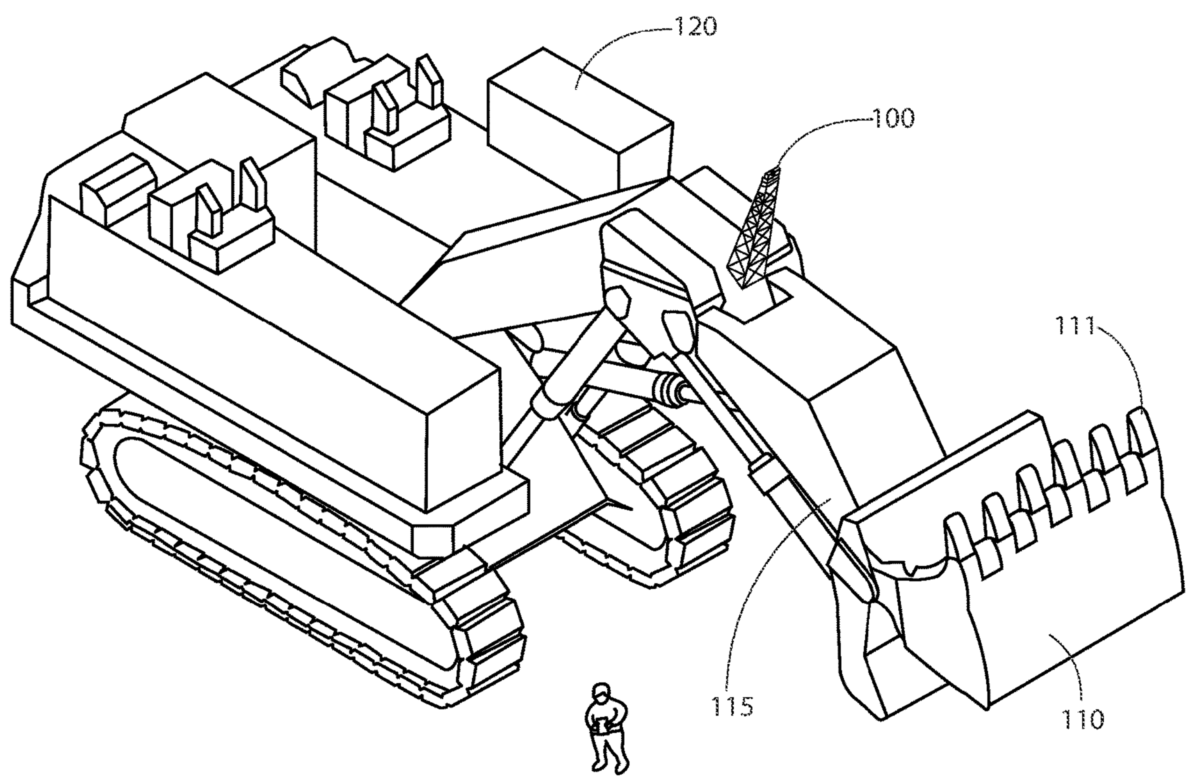
FIG. 1B illustrates the hardware assembly mounted on top of excavating equipment.

The tower assembly 100 may be located on an excavator, as shown in FIG. 1B, where the data collection unit is located optimally at a high point in the equipment to minimize the effects of dust or flying debris. The excavator comprises shovel 110 to which exemplary ground engaging tools/wear parts 111 are installed at locations approximately defining a rim of the shovel. These parts are designed to wear out to protect the shovel or excavator itself from becoming damaged. Excavator arm 115 moves independently of the tower assembly, and an operator cabin 120 contains a user interface for the system, described in further detail below. A person is provided to illustrate approximate scale.

Figure 1C:
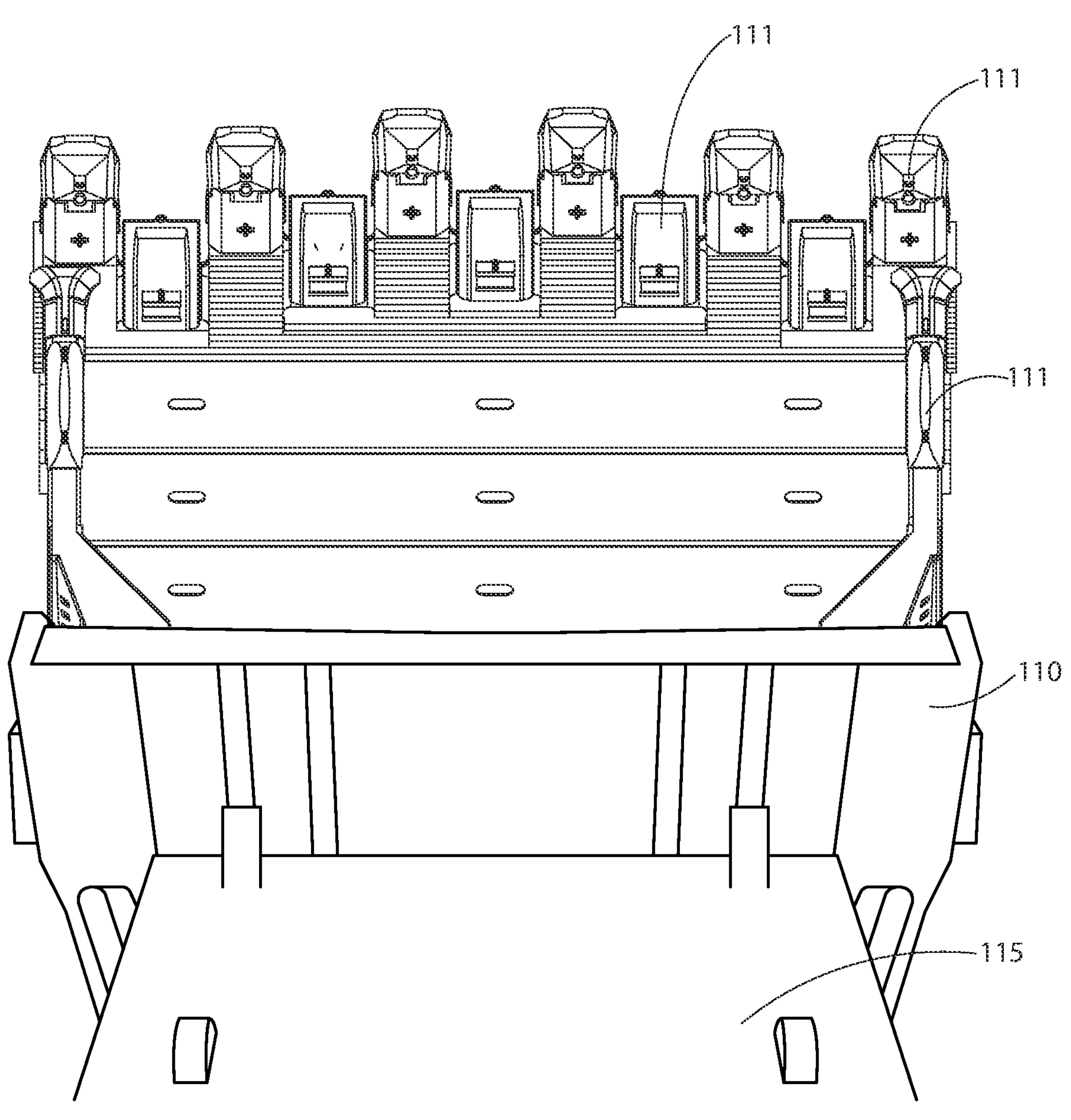
FIG. 1C illustrates the shovel and wear parts.
Figure 1D:
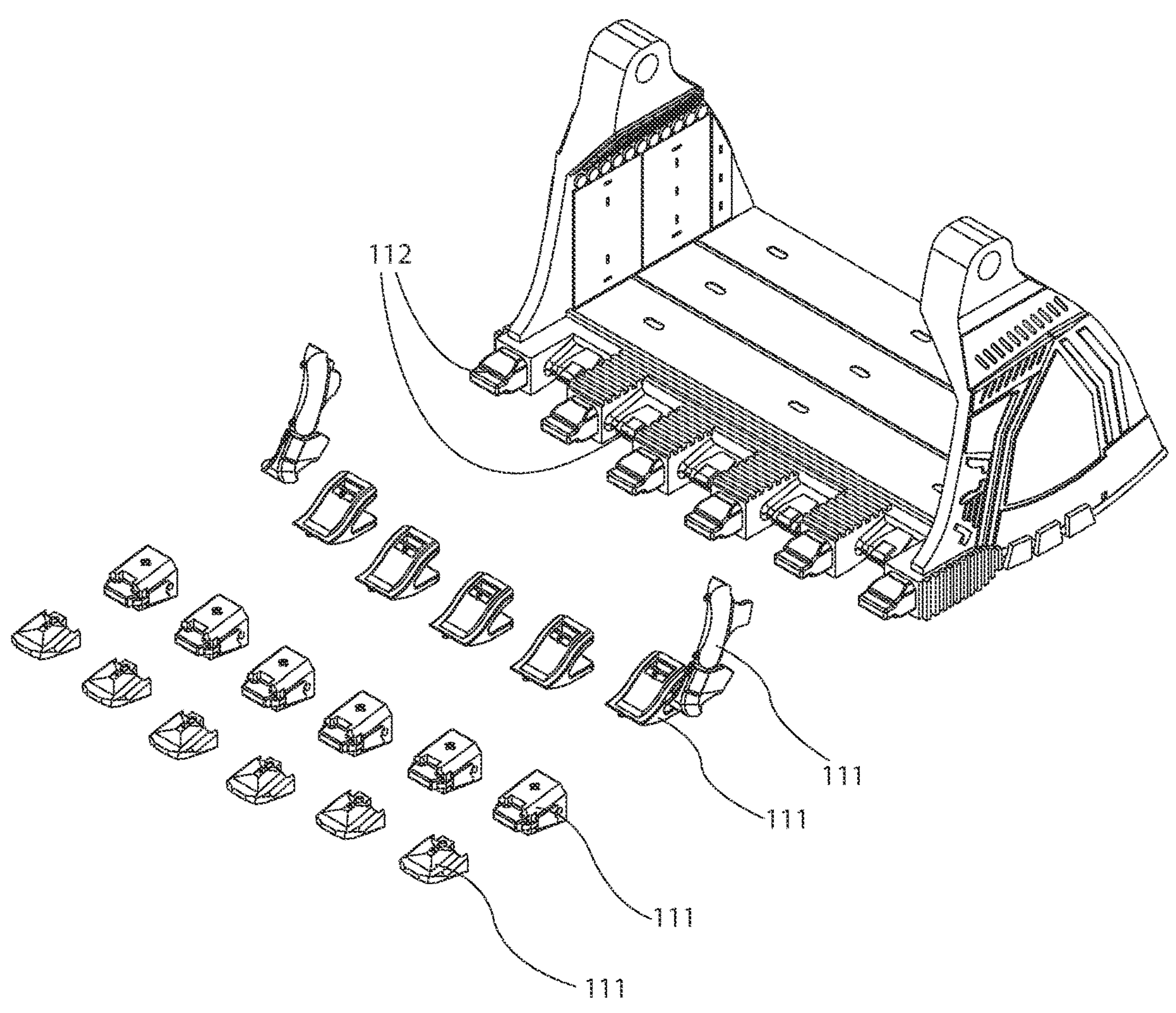
FIG. 1D illustrates the shovel and wear parts in disassembled/exploded view.

FIG. 1C is an exemplary view of the shovel and wear parts as seen from the data collection unit, and FIG. 1D illustrates the wear parts 111 in exploded view. They attach to the shovel via raw attachment points 112 which are not designed to wear. If an attachment point is visible at any time, it means that one or more wear parts have detached. Any part, individually or in combination, are subject to detachment at any time in the mining operation.

Figure 1E:
FIG. 1E illustrates the operator cabin.

FIG. 1E is an exemplary view of the inside of the operator cabin. The Get smart system user interface is represented by one monitor module 121 placed in a conspicuous location for the equipment operator. In a preferred embodiment, this feature may be implemented with visual and audible alarms, and a mobile app that notifies off-site personnel is explicitly contemplated.

Figure 1F:
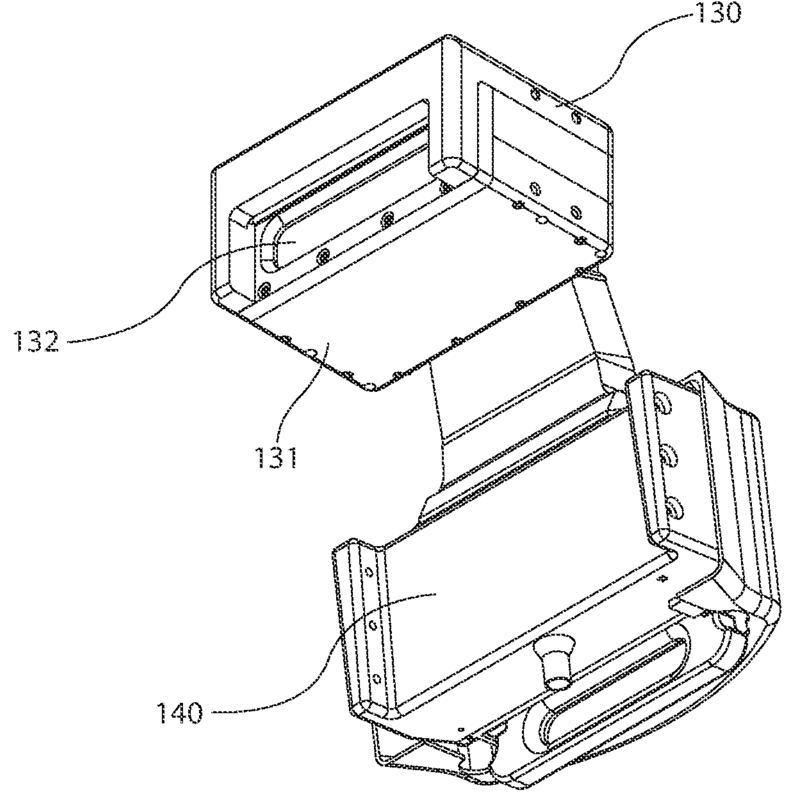
FIG. 1F illustrates the data collection unit.

FIG. 1F shows the data collection unit 102 in isolation. Various sensors are housed in sensor enclosure 131, which includes at least one or more stereoscopic cameras and LIDAR sensors. Other video cameras known in the art may also be used to collect visual data. These cameras are protected from the elements via a camera window 132. In an exemplary embodiment, these sensors may be Intel RealSense D455 active stereoscopic cameras, and Continental High Resolution 3D Flash LiDAR.

The environmental sensor, which provides at least inertial data to track movement of the excavator, contains an accelerometer, gyroscope, and magnetometer. It is additionally capable of collecting temperature, atmospheric pressure, humidity, noise, and luminescence data. In an exemplary embodiment, this sensor may be the Bosch XDK. The sensor is installed in the tower assembly.

The sensor enclosure is protected by airblade system 140 which provides conditioned airflow to keep the data collection unit in good working order. The system works by channeling airflow through the top of the enclosure so that it travels past the camera window in a downward direction. This keeps the window clear of dust and moisture buildup and deflects flying debris which may damage the window or the sensors. The conditioned air can also keep the sensors at an optimal operating temperature. This system reduces maintenance requirements and the frequency to which a human is needed to access the physical components.

Enriched Tensor and AI Module

Central to the GET smart system is a data structure known as the enriched tensor, which stores relevant portions of the sensor data captured by the data collection unit; and the software algorithms that manipulate the enriched tensor known as the AI module.

Figure 2A:
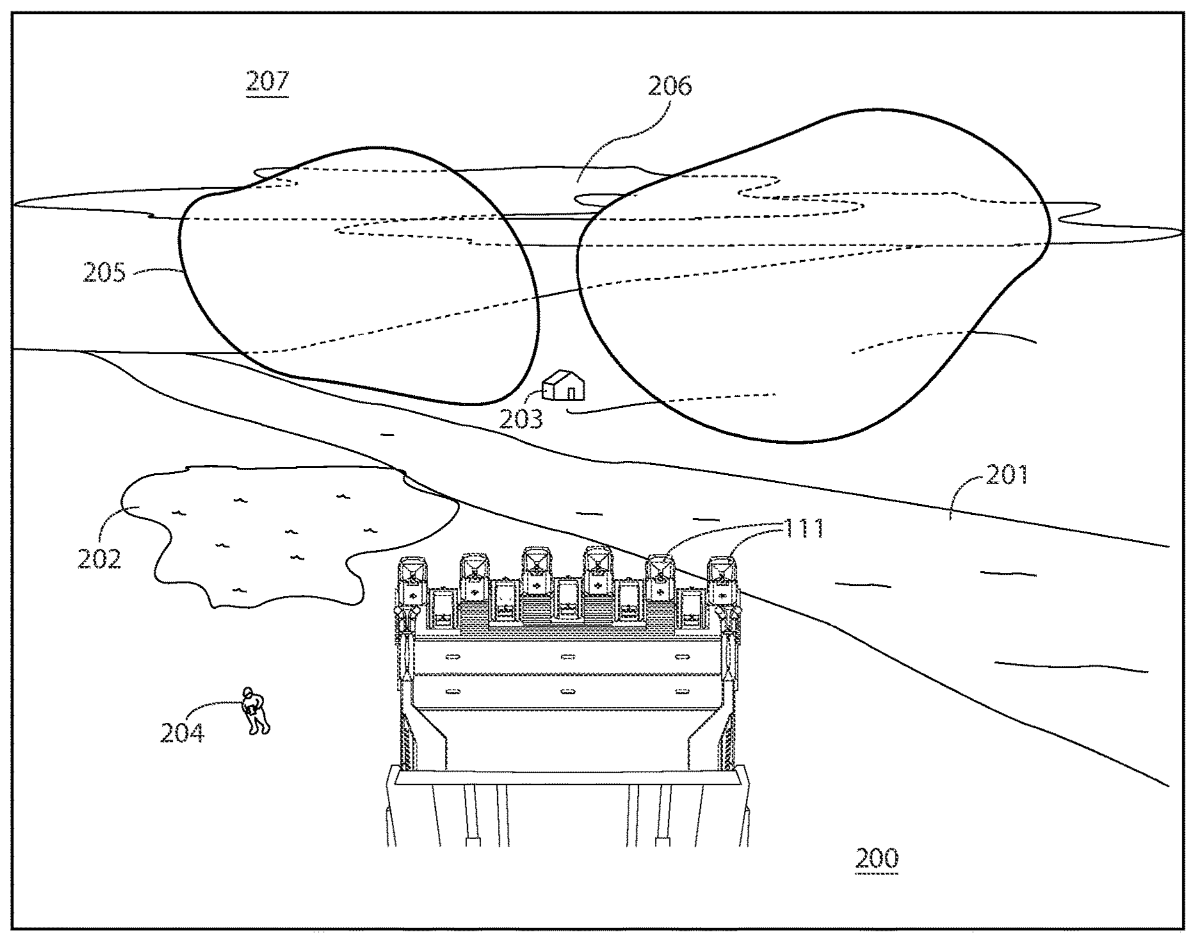
FIG. 2A illustrates an exemplary camera view of the operating environment.

FIG. 2A is an exemplary graphical representation of information as seen by the data collection unit that would be relevant to the system. Within the frame, the camera captures a typical operating environment with the excavator shovel visible in the foreground with most, if not all of the GETs 111 visible. The overall terrain 200 may have a variety of colors or textures based on whether it is dry or wet, whether the sun is shining or overcast, and whether it is day or night. Features such as snowbank 201, puddle 202, building 203, and worker 204 are all visible; water droplet 205 due to rain or condensation is present proximate to the camera lens and therefore obscure vision. Some clouds 206 may be present in sky 207. These features are readily determinable by the human eye but each present their own challenges for machine recognition, which should be focused on detecting GET loss and other desirable characteristics of the mining process.

Figure 2B:
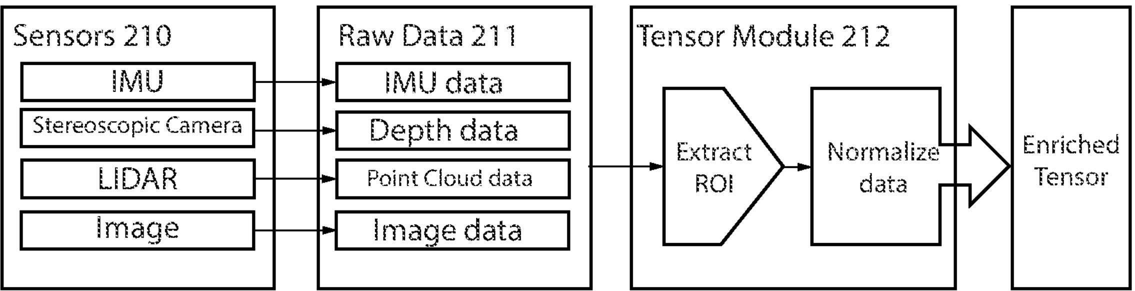
FIG. 2B is a flow diagram illustrating creating an enriched tensor data structure.

As shown in FIG. 2B, The GET smart system begins the recognition process by utilizing a variety of sensors 210 to collect raw data 211 in different formats, both structured and unstructured. An inertial measurement unit (IMU) produces information related to the specific force, angular rate, and orientation of a body of mass, in a time series; stereoscopic cameras provide depth data within the camera's field of vision; LIDAR captures and builds a point cloud of the distances of each point; an imager captures image data in RGB format.

After capturing the raw data, a region of interest (ROI) is calculated by the tensor module 212. This calculation allows the system to efficiently identify the most relevant data for inclusion into the enriched tensor. The ROI is a minimum subset of the data which most likely includes information related to an object of interest.

Figure 2C:
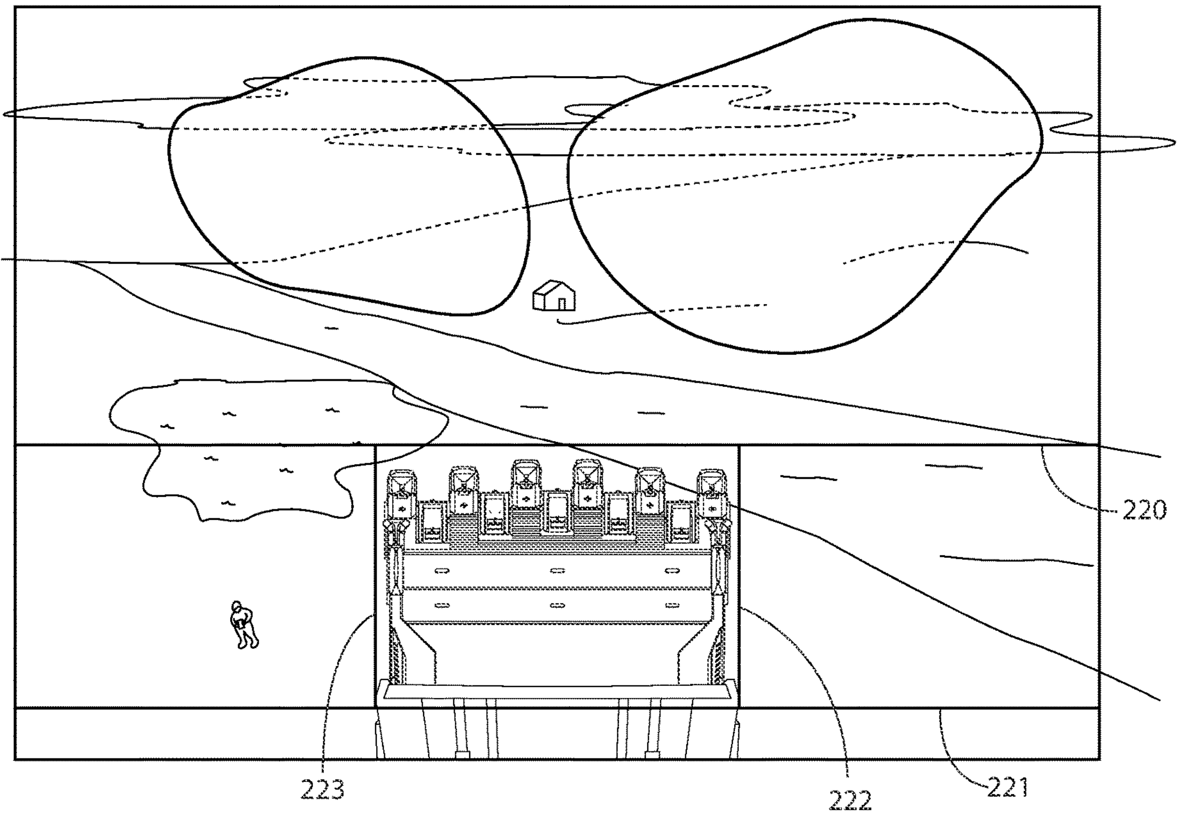
FIG. 2C illustrates an exemplary region of interest.

FIG. 2C illustrates an exemplary ROI. It can be represented by a specific area of the visible screen where the excavator shovel, and consequently objects of interest such as wear parts or attachment points, should appear at any given moment. It is defined by the region inclusive of two horizontal lines 220 and 221 and two vertical lines 222 and 223 where the shovel bucket with GETs visible should almost always appear. Defining such a region immediately limits the visual processing of the system to a fraction of the total data captured, and greatly reduces processing time. It may also be represented in 3D space as further discussed infra.

An ROI may be determined via presets, or even as simply as via IMU data alone. Inertial data collected by the sensor can accurately determine the state of the excavator, whether the shovel is digging or transporting earth, such that the state where the shovel faces up (and the GETs are the most visible) can be optimally determined. The ROI may thus also be time-based, where the system simply ignores the data collected when it knows the shovel faces down and no GETs are visible. By limiting the data, it reduces the likelihood of generating false positives.

In other embodiments, the horizontal lines defining the ROI may be dynamic and generated by taking a center point of detected GETs and applying a minimum and maximum distance to the center point, which is then used as an axis to determine the region where GETs are likely to be found. This technique may prevent occasional edge cases where a GET drifts slightly out of preset areas and results in an incorrect detection. The boundaries of the ROI are different for each implementation and are customizable based on parameters such as the size of the excavator shovel and position of the sensors. The ROI also may not necessarily be a geometric portion of the entire visible screen; it may be limited to the rectangle or cuboid surrounding an object of interest, such as a GET or the "raw" attachment point after a GET detaches.

Returning to FIG. 2B, the tensor module normalizes the collected data that falls within the region of interest, and builds the enriched tensor with this data.

Figure 2D:
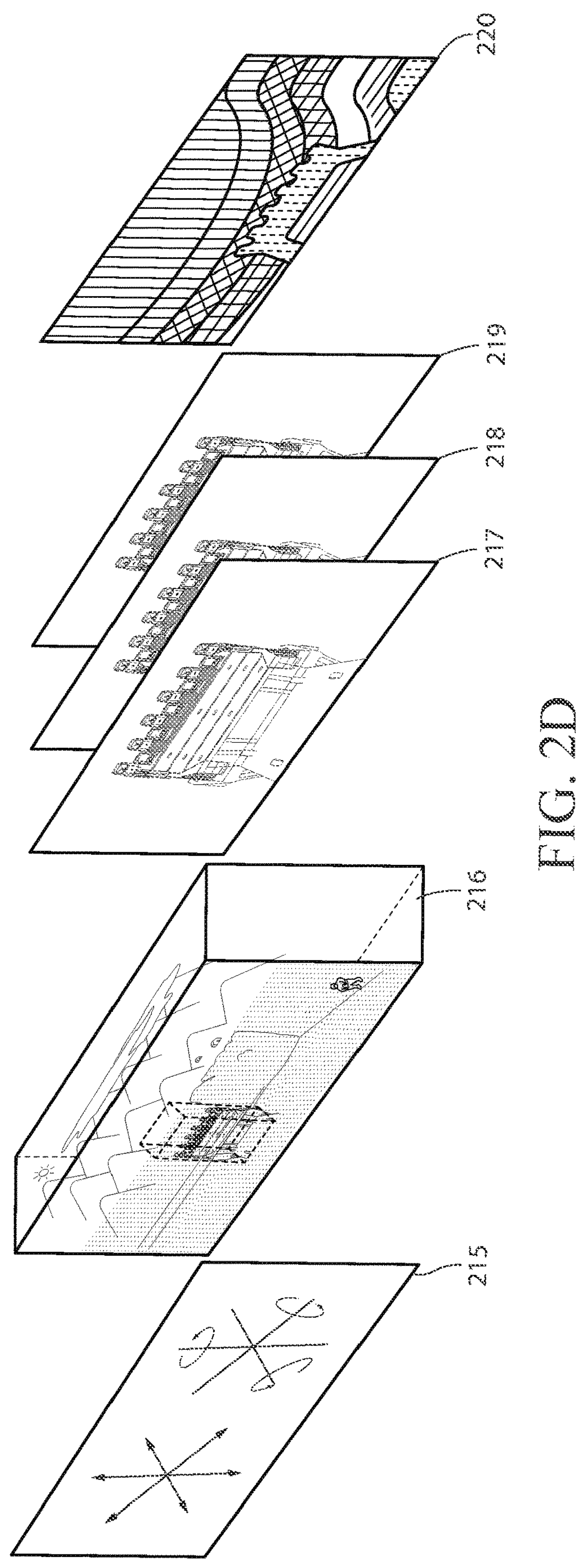
FIG. 2D is a graphical representation of an exemplary frame of the enriched tensor.

FIG. 2D is a graphical representation of an exemplary frame of an enriched tensor: a data structure comprising IMU values 215, point cloud 216, red, green, and blue (RGB) images 217, 218, and 219, and depth frame 220. The data structure may be implemented via multi-dimensional matrices or any data structure known in the visual processing arts. Each frame of the enriched tensor represents a specific moment in time, captured and stored at frame rates varying from 15 to 90 frames per second. The enriched tensor is therefore a time series of inertial, point cloud, image, and depth data of any given region of interest, and is the foundation for further processing.

Figure 2E:
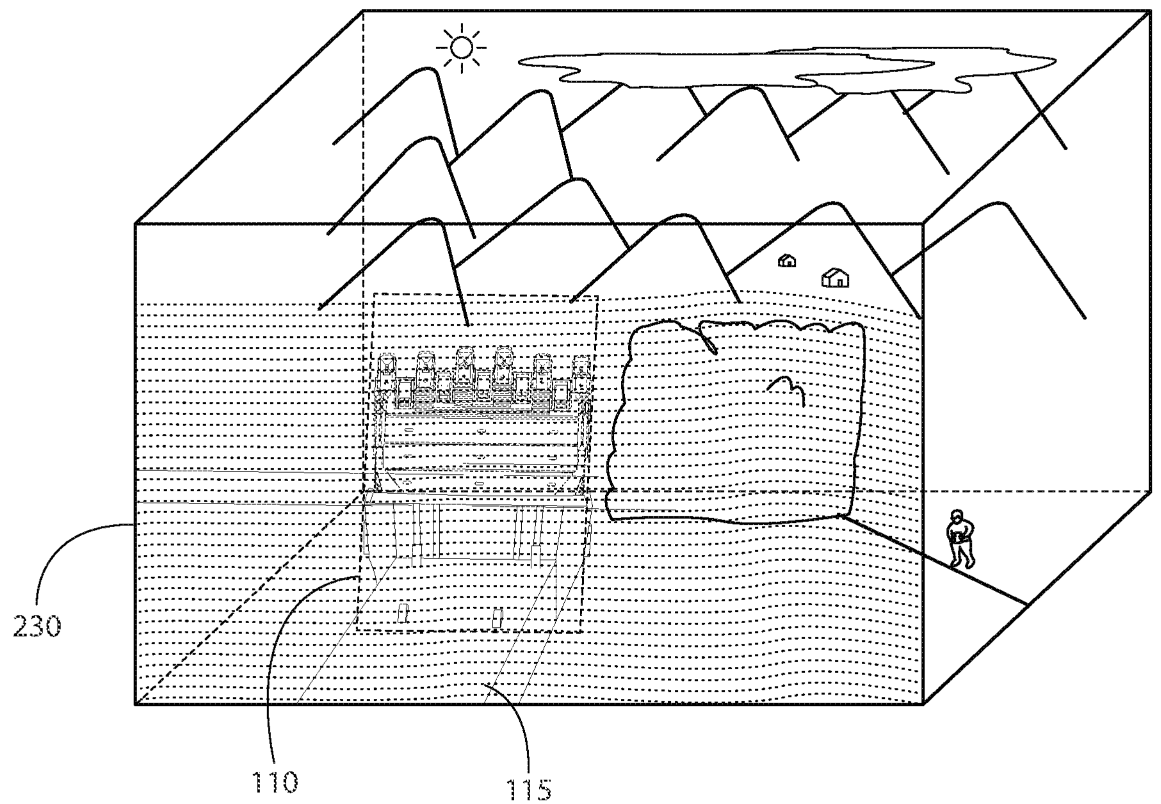
FIG. 2E is a graphical representation of a point cloud.

FIG. 2E is a graphical representation of the point cloud 216 portion of the enriched tensor frame. Because this is a 3D representation, the shovel arm 115 is up near the front (as represented in the drawing) while the bucket is adjacent but somewhat further back. It is expected that the GETs would be at the position as represented in the drawing. Details of the ground, landscape, etc. are in the background.

The region of interest is represented by cuboid 230, which is also the entire volume of the point cloud, because only the portion of the point cloud within the cuboid is present within the enriched tensor. Portions outside are mostly irrelevant and remain unprocessed.

Figure 2F:
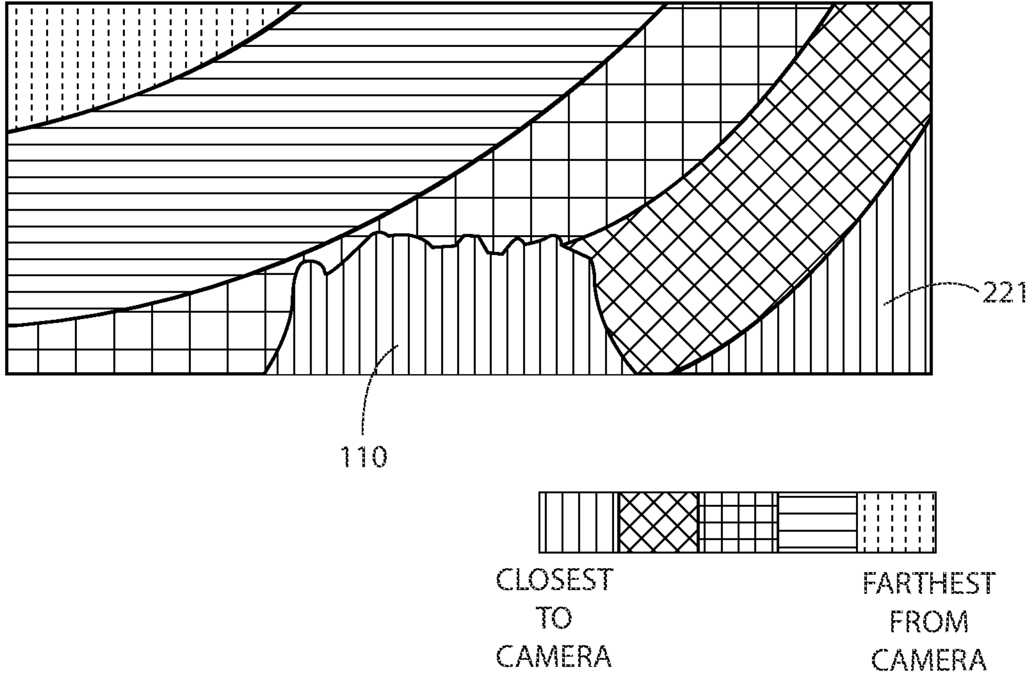
FIG. 2F is a graphical representation of a depth frame.

FIG. 2F is a graphical representation of the depth frame 220 (or depth map) portion of the enriched tensor frame. The shovel 110 is closest to the camera and other captured features are farther back. While a feature 221 of the environment might be close to the distance of the camera, this is usually eliminated from consideration because it falls outside the region of interest. A stereoscopic camera can readily exceed the granularity of the information represented with line drawings, and so this situation is rarely encountered.

Figure 2G:
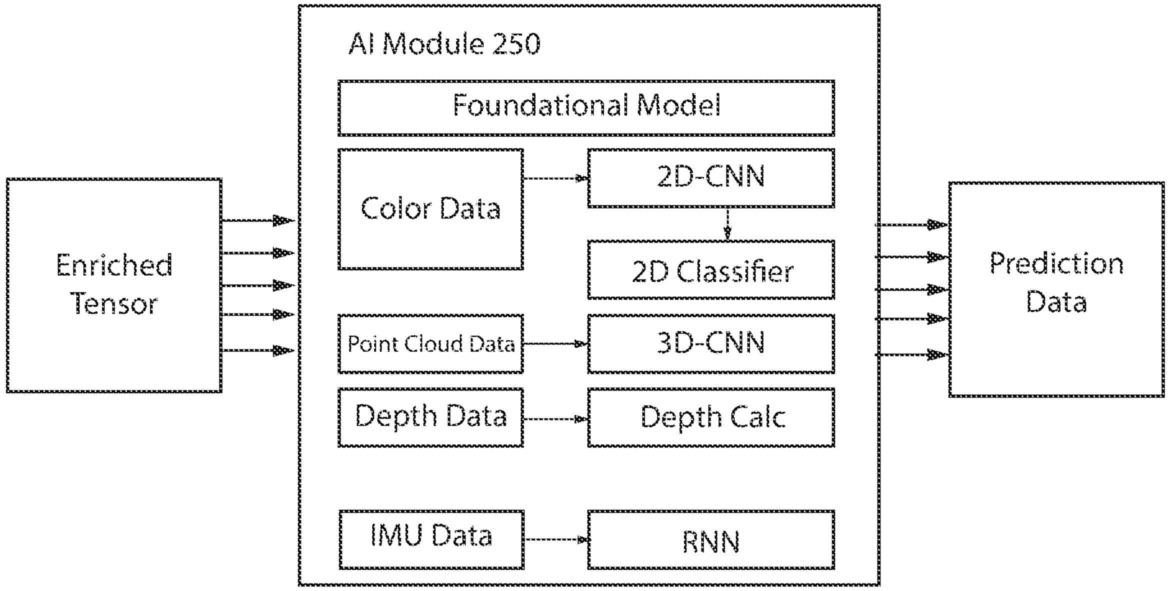
FIG. 2G is a flow diagram illustrating the artificial intelligence module.

FIG. 2G is a flowchart of the AI module 250, which comprises a number of neural networks (NN) adapted to process the individual data flows separately. The enriched tensor is separated into its component streams and processed separately. All neural networks output prediction data, which may include at least a label of an identified relevant object and a confidence level of such a prediction. In a preferred embodiment, the hardware used is a tensor processing unit (TPU) running Google's TensorFlow framework.

The AI module comprises a 2-dimensional convolutional neural network (2D-CNN) configured to process the 2-D image portion of the enriched tensor. The output is fed to a classification model, which makes a refined prediction. Both of these outputs are retained for later use. A weighting process gives a higher score when the outputs agree and a lower score when the outputs do not agree. In a preferred embodiment, the 2D-CNN may be a single shot detector (SSD) with a ResNet-18 neural network as backbone. The classification model may be a dense neural network (DNN), which is a CNN that is 18 to 100 layers deep.

The AI module additionally comprises a 3-dimensional convolutional neural network (3D-CNN) configured to process the point cloud portion of the enriched tensor. This NN is similar to the 2D-CNN except it is trained to process 3-D data. In an exemplary embodiment, this component may be PointPillars.

The AI module further comprises additional calculations used to process depth data to obtain distance to an object of interest, and a recurrent neural network (RNN) to process IMU (inertial) data. An RNN is the preferred embodiment because it is adept at processing time series data, which is what inertial data is structured as. Specifically, a long short-term memory (LSTM) neural network is preferable because it is better at processing long-term dependencies than a regular RNN, and it does not "forget" excavator states that occur only intermittently. Each generates its own outputs.

Finally, the AI module comprises a foundational model, which processes the entire enriched tensor without regard to individual data streams. In a preferred embodiment, the foundational model is not a neural network, but a vision transformer (ViT). A transformer in machine learning is comprised of multiple self-attention layers which are adept at generic learning methods that can be applied to a variety of data modalities. In the GET smart system, it is used to process the entire enriched tensor holistically, and similarly outputs prediction data.

Training and Data Augmentation

A neural network or deep learning model requires training before they can be used in an application environment. The purpose of model training is to build the best mathematical representation of the relationship between detected data features and a label and inure the relationship to the NN. In the GET smart system, training generally involves providing a dataset comprising information regarding the object of interest that is pre-labeled. The training set can be thought of as a set of "right answers" to which the NN must be accustomed to.

A training dataset is divided into at least three subsets: a training subset is used to improve the performance of NNs through supervised learning; a validation subset is used as a quiz to demonstrate proficiency at a task; and a test subset used to obtain a set of proficiency metrics for the NNs.

Table 1 is a quantitative summary chart of relevant features of a training dataset. In one embodiment, the dataset used comprises 37,104 training images and 4,106 test images. The relevant features (the presence or absence of wear parts) are labeled such that the NN can recognize the features. For example, within a dataset, a tooth object is labeled 92,430 times. An object labeled "raw" is an image of a damaged GET or the raw attachment point 112 (see FIG. 1C) visible after the GET has detached.

TABLE 1

| Label | Quantity |
|---|---|
| tooth | 92430 |
| tooth_raw | 23970 |
| tooth_adapter | 92665 |
| adapter_raw | 93692 |
| lip_shroud | 30995 |
| lip_raw | 79503 |
| v_shroud_1 | 16350 |

TABLE 1-continued

| Label | Quantity |
|---|---|
| v_shroud_2 | 6795 |
| v_shroud_raw_1 | 19546 |
| v_shroud_raw_2 | 21481 |
| Total | 477427 |
| Training | 37104 |
| Testing | 4106 |
| Total | 41210 |

The number of features and images in the table are an exemplary embodiment to sufficiently train a 2D-CNN neural network. Each type of model requires its own training dataset. However, it is estimated that at least 10,000 images are required if the dataset were ideal and as diverse as possible; with a less ideal dataset, more than 40,000 images can be needed. For the 3D-CNN that processes point clouds, at least 10,000 point clouds are required.

FIG. 3A illustrates an exemplary training process for a neural network. In a preferred embodiment, the training is conducted in batches of 64 images at a time. After processing each batch 4310, the NN computes the most suitable weights and determines error value 4321 which represents its accuracy in determining features, by performing an intersection 4320 (XNOR) of the predicted labels 4312 and the testing labels 4313 generated by the NN. When the entire epoch (all 580 batches of 64 images) has been presented, weight correction by taking account of the prior error values generated is performed, and the process is repeated.

To reach desired accuracy, 80 to 120 epochs are used per training and between 10 to 20 trainings are performed. The process can take hours or even days. In a preferred embodiment, the training process is implemented on the NVIDIA TAO framework. The training is automated via a pipeline, which runs on dedicated hardware (for training use only) and implemented in Python3.

The procedure for training 3D-CNN is identical to the 2D-CNN in all respects except the intersection of test image labels and predicted labels is three-dimensional. Each model is trained in their own context; for example, only inertial data is used in training the RNN as it will only ever process data obtained from the IMU.

The training dataset is built from a combination of all inputs and sensors collected from similar equipment and environments. Raw data is collected from visual cameras, LIDAR, environmental sensors, IMU, and radar just as in actual operation. However, the GET smart system generates extra training data by manipulating and transforming the initial data set through a process called data augmentation.

The goal of data augmentation is to generate sufficiently diverse training data so the trained AI models are more robust than what is normally achievable through experimentation or simulation. Because actual GET loss events are rare, not all of the dataset needed can be collected in a production environment. Neither are GET loss events captured in sufficiently variable conditions to allow for the training diversity desired.

Some techniques explicitly contemplated are performing mathematical operations to the image, such as presenting a mirror image, tilting the image up to 15 degrees in either direction, zooming in or out, or adjusting the contrast so that the image is brighter or darker.

Other techniques involve applying the operations above to the three-dimensional point cloud. In a preferred embodiment, the point cloud for a particular object of interest is manipulated such that all data points are moved slightly further or closer to a computed point representing the center of the object, generating point clouds of the object that is slightly larger or smaller than the actual object.

In another embodiment, a digital representation of the excavator and the shovel may be generated, comprising synthetic data, in a process known as a digital twin.

GET Loss Detection and Wear Detection Apps

One of the primary tasks of the GET smart system is to detect a GET loss event at the moment of occurrence or as close to the event as possible so that the wear part could be located and removed. This should be accomplished with a frequency of false alerts at or below a tolerable level for the operator so that mining operations are not unduly interrupted.

Another task of the system is to detect the wear level of any particular GET. As these parts are sacrificial, wearing is an integral part of their lifecycle. Accurate prediction of a GET nearing the end of its service span can signal a need for preventative maintenance and avoid a GET loss event altogether.

FIG. 4A is a flow diagram and modules used in either of these tasks. Data from the enriched tensor is pulled into a series of queues for processing. If the stream is selected for recording for later use, such as for training, then the data is sent to the record queue and a record module for retention into storage.

Data selected for processing is queued in the AI module queue and enters the AI module 250, which produces discrete outputs from every model, as explicated supra. These outputs comprise at least a predicted label and an associated confidence level for each label. The outputs comprise at least 3D-FM (3-dimensional foundational model); 3D-CNN; 2D-FM (2-dimensional foundational model); 2D-CNN; 2D classifier; depth; and RNN (inertial) output.

FIG. 4B is a graphical representation of the labels generated by an exemplary module that processes visual data. At any given frame of the enriched tensor, the model recognizes multiple objects of interest, such as a GET 111. Each recognized object is surrounded by a bounding box 410, 412, or 413. Associated with each object is a label 411, which details the type of object recognized, associated with the model's confidence level. Depending on the conditions, not all GETs can be recognized with a high confidence level all of the time. For example, the GET within bounding box 412 displays a confidence level of only 72% because it is partially obscured by material 415.

In the figure, the GET within bounding box 413 is lost or damaged. The AI module determines this and assigns it a "raw" label and a confidence level, which is further processed downstream.

To facilitate readability, not all of the bounding boxes or labels are illustrated herein. Note that while the figure is two-dimensional, a three-dimensional result with bounding boxes being cuboids is generated and manipulated mathematically.

FIG. 4C details the GET smart manager 401, which weighs/tiebreaks the determinations of each AI model and decides whether an alert is warranted. A set of custom thresholds 402 helps make this determination. These thresholds may vary from implementation to implementation, based on the site, environment, or the operator's tolerance for errors. If not all thresholds are met, the system determines that there is a false event and does not sound an alert. But if a consensus is reached, the system reports a true event, and sends notifications and flags the event for recording.

In one embodiment, the manager evaluates the output from the 2D classifier and generates a set of labels and confidence levels for each element detected within a preset bounding box. Output from the 3D-CNN is similarly evaluated except only those objects that overlap the 2D bounding boxes are evaluated. If the models further agree on the labels, the object is considered valid.

More holistically, if multiple models report a missing GET with high confidence but the RNN reports that the shovel is in a position where the GET should not be visible, then it is likely a false detection of an errant particle that resembles a missing GET, and an alert is not sounded. If multiple models report a missing GET in a region that is too close or too far away from the region of interest based on depth data, the manager may determine that the detection is not valid.

FIG. 4D elaborates on an embodiment where a region of interest (ROI) is selected not from presets but from recognizing objects of interest as discussed in FIG. 4B. It is apparent that many objects resembling GETs may be erroneously picked up by the AI models. Therefore, to determine relevant objects of interest, depth map data need to be considered.

In this representation of a depth map, at least some of the GETs are shown selected in their ROIs. For each object recognized, a center of mass is calculated and mapped to a corresponding location on the depth map. Only those that are located within the correct distance (an exemplary distance may be between 7-8 meters) are selected for further processing.

FIG. 4E represents the process for functioning of the wear detection app. The GET smart system generates bounding boxes 420 containing individual GETs and determines a GET shape 421 delineating the border of the GET image. From this shape, distances 423 to a center 422 are computed, from which a polygon approximation can be determined and at least major/minor axes of the shape obtained.

The system also determines GET point cloud 424 from LIDAR data delineating the contours of the GET and subsequently a polygon approximation 425 is calculated.

This information is then computed to determine the physical parameters, such as area, mass, measurements, and volume of a GET. Since these parameters are known for a new GET, a level of wear for each individual GET can be computed.

Volumetric Analysis and Particle Size Analysis Apps

The GET smart system can leverage its AI models to automate certain other tasks without having to physically manipulate or examine the minerals collected. The system performs volumetric analysis of a given shovel load to determine volume and weight of the material scooped up. The system can also provide an estimate of the particle size of the material. As is apparent in the drawings, it is possible to accomplish many different tasks with just one set of sensor data inputs.

Referencing FIG. 5A, the volumetric analysis app first defines a region of interest, delineated by horizontal lines 430, where the area of the surface 431 of a full shovel load is likely to be found. Because of the properties of the minerals collected, this surface is likely to be uneven. From this region, a surface map of all points of the uneven surface can be constructed from at least the point cloud data.

FIG. 5B shows the surface map superimposed over the shape of the shovel bucket. The dimensions 432 of the shovel bucket are known constants. Each point of the surface map corresponds vertically with a known location at the bottom and thus the depth and volume of the shovel load can be computed. If the density of the material is known, a weight of the shovel load can also be determined.

These metrics are available through the user interface to allow, for instance, the operator to quantify the loads placed on a dump truck so that it is properly and efficiently loaded. Underloading a dump truck causes costly inefficiencies during the earth moving process and overloading a dump truck can cause damage to the truck.

Regarding the particle size app, the typical environment in which the excavators operate is to scoop up material after the mine had already been blasted with explosives. The measure of particle size or granulometry is important to adjust and optimize both the blasting process and downstream processing.

Referencing FIG. 5C, the particle size analysis app begins by defining a region of interest delineated by lines 440. The surface analysis involves delineating particle borders 441 on the plurality of particles resting at the surface of the minerals collected.

FIG. 5D shows a plurality of bounding boxes 442 being defined around the particle borders that have been identified. Similar to the wear detection app, distances to a center for each particle are computed, which a polygon approximation can be determined and at least major/minor axes of the shape obtained. The system also determines a plurality of particle point clouds 443 delineating the contours of the particle and subsequently a polygon approximation 444 is calculated.

This information is then computed to determine the physical parameters such as area and volume per particle. These samples at the surface are representative of the entire contents of the shovel because they are scooped up at random, and thus there is no need to analyze sub-surface components.

The size measurement is then converted to useful metrics which inform the mine blasting process and the processing plant. These metrics are reported to the mine blasting operator through the cloud to allow the mine and plant operators to set mineral processing parameters and provide feedback to blasting operations to detect under or over blasting.

The advantages of these applications in the GET smart system are less physical contact and downtime required to examine or measure the material being extracted and thus increasing efficiency and safety.

All publications and patent applications cited in this specification are herein incorporated by reference as if each individual publication or patent application were specifically, and individually, indicated to be incorporated by reference.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An AI-based monitoring system for use with detecting the condition of a shovel during mineral loading in a mining operation, the system comprising:

one or more sensors;

an enriched tensor data structure, further comprising storage for color image data, point cloud data, depth data, and inertial data;

a weighing mechanism;

one or more outputs;

an artificial intelligence module, further comprising a plurality of neural networks adapted to detect a plurality of objects of interest, wherein:

one or more neural networks are configured to process only color images;

one or more neural networks are configured to process only point clouds;

one or more neural networks are configured to process only depth maps;

one or more neural networks are configured to process only inertial data;

one or more foundational models adapted to detect objects of interest and are configured to holistically process color images, point clouds, depth maps, and inertial data; and the one or more neural networks and foundational models each return a result in the form of a predicted object label and a confidence level.

2. The system of claim 1, wherein the neural networks additionally comprise:

one or more convolutional neural networks;

one or more dense neural networks; and one or more recurrent neural networks.

3. The system of claim 1, wherein the foundational models additionally comprise:

one or more vision transformers.

4. A method of detecting the condition of a shovel during mineral loading in a mining operation, the method comprising:

defining one or more regions of interest where an object of interest is likely to be found;

building an enriched tensor data structure based on time-divided frames;

processing the enriched tensor with an artificial intelligence module;

processing one or more results of the artificial intelligence module with a weighing mechanism;

generating an alert based on the results of the weighing mechanism;

wherein the artificial intelligence module comprises:

a plurality of neural networks, wherein a first set of neural networks process color image data, a second set of neural networks process point cloud data, a third set of neural networks process depth data, and a fourth set of neural networks process inertial data; and one or more vision transformers that process data from the enriched tensor in its entirety.

5. The system of claim 1, wherein the weighing mechanism additionally comprises a set of custom thresholds, and arbitrates the results returned by the plurality of one or more neural networks.

* * * * *